(12) United States Patent
Perwass

(10) Patent No.: US 10,791,303 B2
(45) Date of Patent: Sep. 29, 2020

(54) MONITORING MODULE, MONITORING MODULE ARRANGEMENT, MONITORING INSTALLATION AND METHOD

(71) Applicant: Robert Bosch GmbH, Stuttgart (DE)

(72) Inventor: Christian Perwass, Gettorf (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 16/201,342

(22) Filed: Nov. 27, 2018

(65) Prior Publication Data

US 2019/0166332 A1 May 30, 2019

(30) Foreign Application Priority Data

Nov. 29, 2017 (DE) ........................ 10 2017 221 474

(51) Int. Cl.
*H04N 7/18* (2006.01)
*H04N 5/225* (2006.01)
*G08B 13/196* (2006.01)

(52) U.S. Cl.
CPC ....... *H04N 7/181* (2013.01); *G08B 13/19632* (2013.01); *G08B 13/19641* (2013.01); *H04N 5/2251* (2013.01); *H04N 5/2253* (2013.01); *H04N 5/2257* (2013.01)

(58) Field of Classification Search
CPC ....... H04N 5/2251–2254; H04N 7/181; G08B 13/19632
See application file for complete search history.

(56) References Cited

U.S. PATENT DOCUMENTS

| 9,191,627 B1* | 11/2015 | Reid | H04N 5/247 |
| 9,575,394 B1* | 2/2017 | Wallace | H04N 13/243 |
| 2003/0016288 A1* | 1/2003 | Kaylor | H04N 7/181 348/149 |
| 2011/0050855 A1* | 3/2011 | Nobis | G01B 11/2755 348/47 |
| 2011/0069507 A1* | 3/2011 | Haugan | G02B 6/0096 362/551 |
| 2011/0090333 A1* | 4/2011 | Haugan | G06K 9/2036 348/136 |
| 2013/0188054 A1* | 7/2013 | Weinblatt | H04N 7/18 348/159 |
| 2013/0235254 A1 | 9/2013 | Fillbrandt et al. | |
| 2015/0029313 A1* | 1/2015 | Muller | G03B 17/561 348/47 |
| 2015/0358605 A1* | 12/2015 | Muller | H05K 3/301 348/47 |

(Continued)

FOREIGN PATENT DOCUMENTS

DE    102010039431    2/2012

*Primary Examiner* — Jeremiah C Hallenbeck-Huber
(74) *Attorney, Agent, or Firm* — Michael Best & Friedrich LLP

(57) ABSTRACT

Extensive monitoring areas must often be monitored for security-related monitoring. Particularly the installation and calibration of the cameras is complex. A monitoring module 4 for the visual monitoring of a monitoring area 5 is proposed, having at least three cameras 6 to monitor the monitoring area 5, wherein the monitoring module 4 is configured as strip-shaped and/or bar-shaped, wherein the cameras 6 are arranged at defined camera intervals along a longitudinal extension L of the monitoring module 4.

12 Claims, 4 Drawing Sheets

(56) References Cited

U.S. PATENT DOCUMENTS

2017/0234602 A1* 8/2017 Seo .................. H04N 7/181
                                                     348/151
2019/0049391 A1* 2/2019 Kleindorp .......... G01N 21/8851
2019/0297238 A1* 9/2019 Klosterman ......... H04N 5/2258

* cited by examiner

MONITORING MODULE, MONITORING MODULE ARRANGEMENT, MONITORING INSTALLATION AND METHOD

BACKGROUND OF THE INVENTION

Monitoring module for the visual monitoring of a monitoring area, having at least three cameras to monitor the monitoring area.

Monitoring areas are frequently monitored by means of cameras. It is often important for the monitoring to be performed over an extensive area. The cameras are arranged in the monitoring area for this purpose, wherein the number of cameras is minimized in order to reduce costs. A calibration is often performed following the installation of the cameras so that, for example, a three-dimensional monitoring of the monitoring area is also possible.

Document DE 10 2010 039 431 A1, which probably forms the closest prior art, describes an apparatus to support a focusing of a camera equipped with a manual focusing device for the provision of digital image contents, in particular a smart camera, wherein means are provided for determining a focus value of the camera depending on an operation of the manual focusing device and means are provided for displaying focusing information to a user on the basis of the determined focus value.

SUMMARY OF THE INVENTION

A monitoring module for monitoring a monitoring area is proposed according to the invention. In particular, the monitoring by means of the monitoring module is a visual monitoring, an image-based monitoring and, for example, additionally a different sensory monitoring. The monitoring area is preferably an internal area, for example a building. In particular, the monitoring area is a connected area or, alternatively, the monitoring area may also be fragmented and/or have gaps. The monitoring module is configured, for example, for attachment to a ceiling of the monitoring area and/or to a wall of the monitoring area.

The monitoring module comprises at least three cameras to monitor the monitoring area. In particular, the monitoring module may comprise at least four cameras, preferably more than ten cameras and, especially, more than 100 cameras. The cameras are preferably color cameras or, alternatively, they are black-and-white (monochrome) cameras or infrared cameras. It can furthermore be provided that the cameras are ToF cameras, multispectral cameras or stereo cameras. It is particularly preferable if the cameras are low-cost cameras, for example Smartphone cameras. The cameras are, for example, button-shaped cameras. In particular, the cameras have a thickness of less than 2 cm. The cameras have, especially, a camera ID.

The monitoring module is configured as strip-shaped and/or bar-shaped. The monitoring module has a longitudinal extension and a width, wherein the longitudinal extension is at least ten times, preferably at least 25 times and, especially, at least 50 times greater than the width. The width is, for example, greater than 1 cm and, in particular, greater than 3 cm. The longitudinal extension is, in particular, greater than 20 cm and, especially, greater than 1 m. The strip-shaped monitoring module has an outer side facing toward the monitoring area. The cameras are arranged, especially, on the monitoring module, in particular on the outer side.

The cameras are arranged at defined intervals along the longitudinal extension. The cameras are arranged, for example, at equidistant intervals from one another. The cameras are preferably arranged in a straight line. Alternatively, the cameras can also be arranged in a zigzag line. It can furthermore be provided that the cameras are arranged at defined positions on the monitoring module.

The cameras have a field of view, a direction of view and an angle of view. The directions of view of the cameras are preferably similarly aligned. Alternatively, the cameras have differently aligned directions of view. The fields of view of the cameras have an overlap area. The cameras are arranged, in particular, in such a way that they in each case have a common overlap area at least on a pair-by-pair basis and/or a common section of the monitoring area. The cameras are preferably arranged so that the monitoring area is monitored by the cameras without gaps.

The invention is based on the consideration of providing a monitoring module with which an extensive monitoring area can be monitored economically and effectively. A particular consideration is to provide a monitoring module with which a complex calibration following the installation of the modules in the monitoring area can be dispensed with and/or simplified.

One design of the invention provides that the monitoring module can be coupled mechanically and/or via a data communication connection to a further monitoring module of the same type. To do this, the monitoring modules in each case comprise, for example, a coupling interface and a counter-coupling interface, wherein the monitoring modules can be coupled by coupling the coupling interface of the one monitoring module to the counter-coupling interface of the other monitoring module. The coupling interface and/or counter-coupling interface is preferably a clip-on interface and/or a snap-on interface. The coupling interface and/or the counter-coupling interface can be configured as a mechanical, electromagnetic and/or data communication interface. In particular, the counter-coupling interface and coupling interface are configured in such a way that data are exchangeable and/or transmittable between the monitoring modules.

It is particularly preferable for the monitoring module to be flexible and/or rollable. The monitoring module is, for example, reversibly deformable. The monitoring module is preferably configured as flexible. The monitoring module can, for example, be rolled up on a roll. In particular, it can be provided that the monitoring module is configured in a manner similar to an adhesive strip and is rolled up on a roll. In particular, it can be provided that the monitoring module has an adhesive layer to attach the monitoring module monitoring area, wherein the monitoring module(s) is/are rolled up on a roll to protect the adhesive layer. It can furthermore be provided that a plurality of monitoring modules can be rolled up on a roll.

One design of the invention provides that the monitoring module has a camera attachment section and a communication section. The cameras, in particular, constitute the camera attachment section. The communication section has, in particular, structures for data transmission. The communication section comprises, for example, a data bus for this purpose. In particular, the communication section comprises data lines for the data transmission.

The communication section can be coupled mechanically and/or via a data communication connection to the camera attachment section. To do this, the communication section and the camera attachment section have interfaces for coupling to one another. These interfaces are configured, for example, as snap-on interfaces. Following the coupling of the camera attachment section and the communication section, said sections are securely interconnected.

In particular, it is provided that the coupling of the communication section and the camera attachment section is a reversible coupling and can, for example, be released if required. The camera attachment section can be fitted by means of the communication section to a wall and/or a ceiling. One consideration of the invention is that the interference-resistant and/or fault-resistant communication section is arranged in the monitoring area and is connected via a data communication connection to an evaluation device, wherein the failure-prone cameras are arranged on a camera attachment section which can be exchanged if a camera is damaged without the data communication connection having to be modified.

It is particularly preferable for the communication section and the camera attachment section to be configured as strip-shaped and/or bar-shaped. The camera attachment section and the communication section are preferably configured as congruent or compatible or similar. In particular, it is provided that the camera attachment section has a thickness, wherein this thickness, in particular, defines the protrusion from the wall and/or the ceiling, wherein the thickness is preferably less than 1 cm and, especially, less than 5 mm. The communication section furthermore has a thickness, wherein the thickness of the communication section determines the protrusion from the wall and/or ceiling, wherein the thickness of the communication section is preferably less than 5 mm and, especially, less than 2 mm. The longitudinal extension of the communication section corresponds, for example, to the longitudinal extension of the camera attachment section, wherein said longitudinal extensions correspond to the longitudinal extension of the monitoring module. This design is based on the consideration of providing a facility with which the distribution of the cameras in the monitoring area is already evident when the communication section is installed.

One design of the invention provides that the monitoring module comprises a communication interface to provide monitoring data. In particular, the communication interface forms part of the communication section. The communication interface is configured to provide the monitoring data, for example a monitoring device. The monitoring data comprise the camera data of the cameras of the monitoring module. To do this, the camera data, for example, of all cameras of the camera attachment section connected thereto are supplied to the communication module. It can furthermore be provided that the monitoring data comprise camera IDs. In particular, the camera data and/or the monitoring data comprise the image data recorded by the cameras, a timestamp for the recorded images, an allocation of image data and camera ID, the camera positions and/or the camera spacings.

It is particularly preferable for the monitoring module, in particular the camera attachment section, to comprise at least one sensor. The sensor is configured for the sensory monitoring of the monitoring area. The sensor is configured to provide sensor data, wherein the sensor data preferably constitute the monitoring data. The sensor is, for example, a microphone, a smoke detector, a fire detector, a radioactivity-measuring device, an aerosol-determining sensor, a temperature sensor or a humidity sensor. It can furthermore be provided that the monitoring area and, in particular, the camera attachment section, comprise an actuator. The actuator is, for example, a projection apparatus, for example to project a pattern for a stereoscopic evaluation of the monitoring area. The actuator may furthermore be a projection apparatus to project symbols, for example emergency exit directions. It can similarly be provided that the actuator is an ultrasonic loudspeaker, for example for the targeted generation of an audible signal at a specific position in the monitoring area.

It is optionally provided that the monitoring module is configured to supply a module ID, a module geometry, a module position, the camera spacings and/or the camera positions to an evaluation device and/or a coupled monitoring module. This information preferably constitutes the monitoring data. These data and/or the monitoring data can be transmitted, for example, by means of the communication interface. It is provided, for example, that the monitoring module, in particular the communication section, comprises a data preprocessing module, wherein the data preprocessing module is configured to compress the monitoring data, in particular the camera data, before transmission. The data preprocessing module is configured, for example, to reduce camera data, in particular images, when two consecutive images have hardly any change. The module position is, in particular, the position of the monitoring module in the monitoring area and/or in the model. The module geometry preferably comprises information relating to the connection facilities and orientations of the monitoring module.

A monitoring module arrangement with a plurality of monitoring modules forms a further subject-matter of the invention. The monitoring module arrangement comprises, in particular, at least two monitoring modules, preferably more than ten monitoring modules and, especially, more than 25 monitoring modules. The monitoring modules are coupled mechanically and/or via a data communication connection. The coupled monitoring modules may be of identical design or may have different designs. In particular, the monitoring modules are connected and/or arranged in such a way that they can monitor the entire monitoring area without gaps.

One design provides that one of the monitoring modules of the monitoring module arrangement forms a collective transmit module. The monitoring data of all monitoring modules of the monitoring module arrangement are supplied to the collective transmit module. The collective transmit module is configured to provide and/or transmit monitoring data of all monitoring modules of the monitoring module arrangement through data communication, for example to the evaluation device. It can furthermore be provided that the monitoring module arrangement has a plurality of collective transmit modules. The collective transmit modules can form a termination or can be arranged between two monitoring modules.

It is particularly preferable for the monitoring data to comprise coupling data. The coupling data comprise information indicating which monitoring module is coupled to which monitoring module. In particular, the monitoring data comprise information indicating the manner in which, the geometry with which and/or angle at which two monitoring modules are coupled to one another. This design is based on the consideration, with knowledge of the position of one monitoring module, of being able to reconstruct the positions of the other monitoring modules and/or cameras.

It can furthermore be provided that the monitoring module arrangement has a spacing module. In particular, the spacing module is also configured as strip-shaped and/or bar-shaped. It can be provided that the spacing module is configured as straight, kinked or bent. The spacing module has a spacing module length and/or a spacing module geometry. The spacing module length is, in particular, the length of the longitudinal extension of the spacing module.

The spacing module geometry comprises the shape, branching and/or coupling facilities of the spacing module. The spacing module is configured to connect two monitoring modules at a distance from one another. It is provided, in particular, that the spacing module can be coupled to the two monitoring modules mechanically and/or via a data communication connection. The spacing module is configured to provide spacing module data. In particular, the spacing module data can constitute the monitoring data. The spacing module data comprise the spacing module geometry and/or the spacing module length. The spacing module data may furthermore also comprise information from the coupling of the spacing module to monitoring modules. This design is based on the consideration of bypassing areas which do not have to be monitored by means of a favorable spacing module and only using monitoring modules once more in areas which require monitoring. Through the provision of the spacing module data and on the basis of the knowledge of one position of a monitoring module, the positions of the further monitoring modules and/or cameras can be reconstructed by means of the monitoring data and the spacing module data. This reconstruction can be performed, for example, by an evaluation device.

A monitoring installation with an evaluation device and at least one monitoring module and/or one monitoring module arrangement forms a further subject-matter of the invention. The evaluation device is preferably a computer unit, a data processing unit or a processor unit. The evaluation device is preferably arranged centrally, wherein the monitoring data, in particular the camera data, of all cameras and/or monitoring modules are supplied to the evaluation device. The evaluation device is configured to visually monitor the monitoring area on the basis of the monitoring data. The visual monitoring by means of the evaluation device may entail, for example, the generation of a 2D or 3D view of the monitoring area and/or a section of the monitoring area. It can furthermore be provided that the evaluation device is configured to track an object moving in the monitoring area. The monitoring of the monitoring area by means of the evaluation device can furthermore be based on the sensor data. The evaluation device can be configured, in particular, to detect a safety-related event in the monitoring area, for example a fire, and/or can be configured to detect a room occupancy in the form of the number of persons in the room. It can furthermore be provided that the evaluation device is configured to carry out a gait analysis and/or to collect biometric data.

It is particularly preferable for the evaluation device to be configured to determine the camera positions and/or the positions of the monitoring on the basis of a model of the monitoring area. The model of the monitoring area is, for example, a 3D model and, especially, a CAD model. In particular, the evaluation device is configured to determine the position of the cameras and/or the positions of the monitoring modules in the monitoring area on the basis of the module geometry, the module ID, the module position, the coupling data, the camera spacings, the spacing module length and/or the spacing module geometry. This design is based on the consideration that, on the basis of the knowledge of one position of a monitoring module, a reconstruction of all camera positions can be performed with the additional information.

A method for monitoring a monitoring area with the monitoring module, the monitoring module arrangement and/or the monitoring installation forms a further subject-matter of the invention. At least one monitoring module or one monitoring module arrangement is arranged in the monitoring area, wherein the monitoring module is arranged, in particular, with a direction of view toward the monitoring area to be monitored. The monitoring module and/or the monitoring module arrangement provide(s) monitoring data of the visual monitoring of the monitoring area. The monitoring data are preferably supplied to the evaluation device. The evaluation device can generate a 2D and/or 3D view of the monitoring area and/or can track an object in the monitoring area on the basis of the monitoring data. On the basis of one known position of a monitoring module in the monitoring area, the evaluation device can furthermore determine the positions of the other monitoring modules and/or cameras on the basis of the monitoring data. This design is based on the consideration of enabling a monitoring of the monitoring area wherein an installation of the cameras and their calibration is particularly simple, this being achieved here by obtaining the camera positions on the basis of at least one known position and additional information.

BRIEF DESCRIPTION OF THE DRAWINGS

Further features, advantages and effects of the invention are set out in the following description of preferred example embodiments of the invention and the attached figures, in the figures.

DETAILED DESCRIPTION

Figure 1:
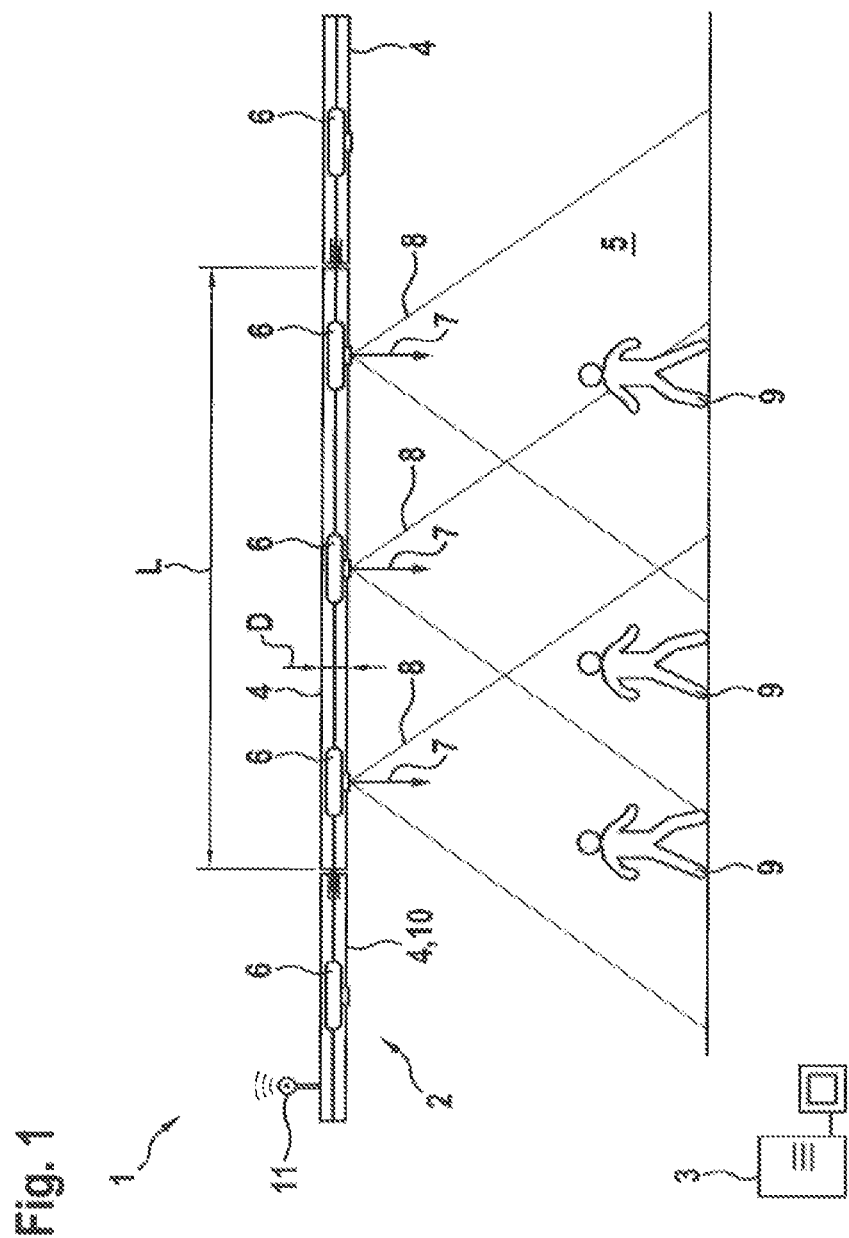
FIG. 1 shows a schematic view of one example embodiment of a monitoring installation.

FIG. 1 shows a schematic view of a monitoring installation 1. The monitoring installation 1 comprises a monitoring module arrangement 2 and an evaluation device 3. The monitoring module arrangement 2 comprises a plurality of monitoring modules 4. The monitoring module arrangement 2 is arranged on a ceiling of the monitoring area 5. The monitoring module arrangement 2 is configured for the visual, image-based and/or video-based monitoring of the monitoring area 5.

The monitoring modules 4 in each case comprise a plurality of cameras 6. In particular, the monitoring module 4 comprises at least and/or exactly three cameras 6. The cameras 6 are preferably configured as color cameras and, especially, as compact cameras, for example Smartphone cameras. The cameras 6 have a direction of view 7, an angle of view and a field of view 8. The cameras 6 of a monitoring module 4 are arranged with a similarly aligned direction of view 7. In particular, the cameras 6 are arranged so that the cameras 6 in each case have an overlap of the field of view 8 on a pair-by-pair basis. The monitoring cameras 6 are arranged at fixed positions and/or at fixed camera intervals from one another in the monitoring module 4.

The monitoring modules 4 are configured as strip-shaped and/or bar-shaped. The monitoring modules 4 have a longitudinal extension L, wherein the longitudinal extension L is at least ten times the width of the monitoring module. The longitudinal extension L of the monitoring modules 4 is, in particular, greater than half a meter and, especially, greater than 1 m. The monitoring modules 4 furthermore have a thickness D, wherein the thickness D is less than 1 cm.

The monitoring modules 4 can be coupled to one another mechanically and via a data communication connection. In particular, the monitoring module arrangement 2 can be obtained through the coupling of the monitoring modules 4. One monitoring module 4 of the monitoring module arrangement 2 is configured as a collective transmit module 10. The collective transmit module 10 has a data interface 11. The data interface may, in particular, form the communication interface. The monitoring data of all monitoring modules 4 are supplied to the data interface 11. Monitoring data comprise the image data recorded by the cameras 6. The data interface 11 is configured to supply all image data collectively to the evaluation device 3. To do this, the data interface 11 can be coupled, in particular via a data communication connection, to the evaluation unit 3.

A moving object 9 can be detected and/or tracked in the monitoring area 5 by means of the monitoring installation 1. To do this, the monitoring module 4 supplies monitoring data to the evaluation device 3. The monitoring data comprise, in particular, camera data, wherein the camera data have images of the monitoring of the monitoring area 5 by means of the cameras 6. The evaluation device 3 can, for example, evaluate and/or monitor the monitoring area 5 stereoscopically.

Figure 2:
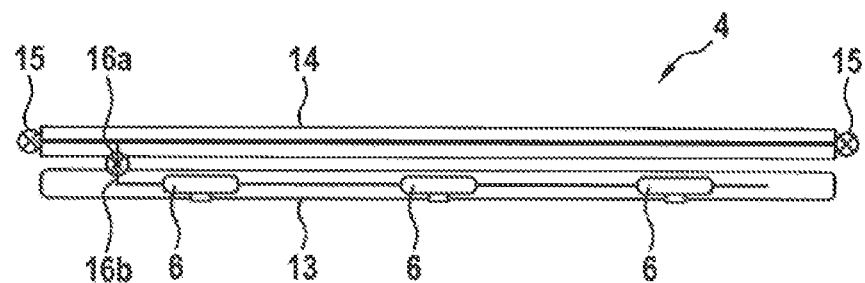
FIG. 2 shows a schematic detailed view of one example embodiment of a monitoring module.

FIG. 2 shows schematically a detailed view of a monitoring module 4. The monitoring module 4 comprises a communication section 12 and a camera attachment section 13.

The communication section 12 is configured as bar-shaped. In particular, the communication section 12 is configured as inflexible and, for example, as a metal bar. Alternatively, the communication section 12 can be configured as flexible, for example as a plastic strip. The communication section 12 has a communication bus 14. The communication section 12 furthermore has a communication interface 15, wherein the communication interface 15 can be coupled to communication interfaces 15 of a further monitoring module 4. The monitoring data are transmittable, in particular, from the monitoring module 4 to the monitoring module 4 through this coupling. The communication section 12 furthermore has an interface 16, wherein this interface 16a can be coupled to a counter-interface 16b.

The camera attachment section 13 has the counter-interface 16b. The camera attachment section 13 can be coupled mechanically and via a data communication connection to the communication section 12 through the coupling of the interface 16a and the counter-interface 16b. This coupling represents, in particular, a reversible coupling. The image data of the cameras 6 can be transferred from the camera attachment section 13 to the communication section 12 by means of the data communication coupling between the communication section 12 and the camera attachment section 13.

It is thus possible, for example, first to install the bar-shaped communication sections 12 on a ceiling in a monitoring area 5 and to connect them via a data communication connection to the evaluation device 3. Following the installation of the communication sections 12, the more sensitive camera attachment sections 13 can then be attached with the cameras 6 to the communication sections 12, for example by means of an automatic interlock. It can be provided, for example, that the camera attachment section 13 is configured as flexible and/or elastic. Furthermore, a camera attachment section 13 can thus simply be replaced with a new camera attachment section 13 without having to modify the data communication connection.

Figure 3:
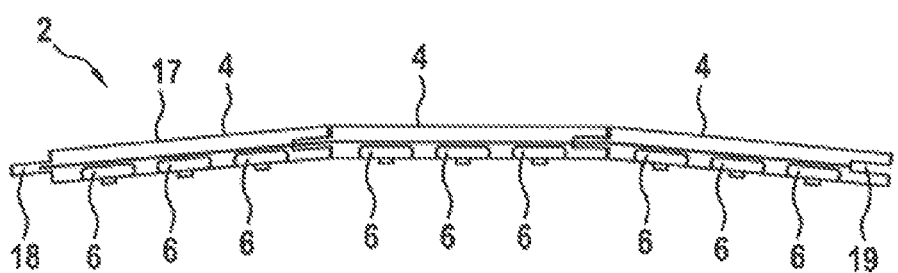
FIG. 3 shows a schematic detailed view of one example embodiment of a monitoring module arrangement.

FIG. 3 shows schematically a detailed view of a monitoring module arrangement 2. Here, the monitoring module arrangement 2 comprises a plurality of monitoring modules 4. The monitoring module arrangement 2 and the monitoring modules 4 are configured as flexible. The monitoring modules 4 are manufactured, for example, from a deformable or pliable plastic. The monitoring modules 4 in each case have a coupling interface 18 and a counter-coupling interface 19. The coupling interface 18 and the counter-coupling interface 19 can be coupled to one another and are configured, in particular, as data communication and mechanical interfaces. The counter-coupling interface 19 is configured, for example, as a slot, wherein it has an electronic contact for the data transmission. In this design, the coupling interface 18 is then configured as a spring, wherein the spring similarly has an electronic contact for the data transmission of the monitoring data and camera data and for the contacting with the electronic contact in the slot.

The monitoring modules 4 have an adhesive layer 17. The adhesive layer 17 is arranged on a rear side of the monitoring module 4, wherein the rear side represents the side facing away from the monitoring area to be monitored. The monitoring modules 4 are arrangeable and/or attachable on a ceiling and/or wall in the monitoring area 5 by means of the adhesive layer 19. The flexible and/or elastic monitoring modules 4 are, in particular, rollable. The monitoring modules 4 can be supplied to a customer, for example, in a manner similar to an adhesive strip rolled up on a roll.

Figure 4:
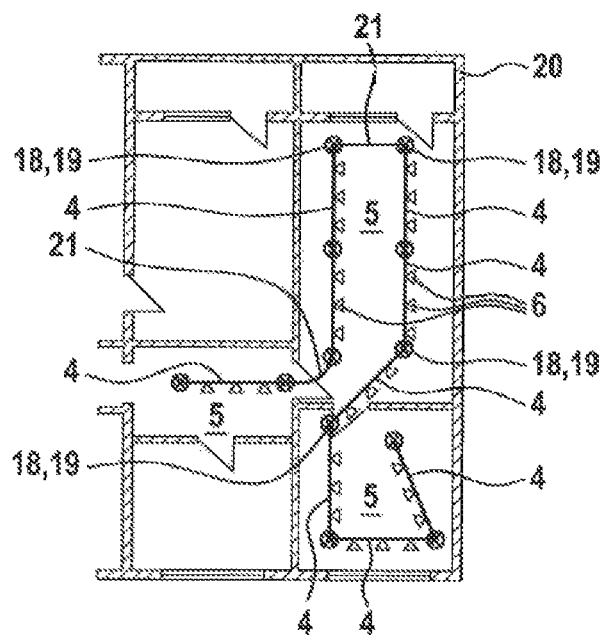
FIG. 4 shows one example of a method for monitoring a building.

FIG. 4 shows the arrangement of a monitoring module arrangement 2 for a method for monitoring a monitoring area 5 configured as a building. The monitoring area 5 is shown here as a model 20. The model 20 is configured as a 2D plan of the monitoring area 5. In particular, the model 20 is stored in the evaluation device 3.

The monitoring modules 4 are coupled to one another mechanically and via a data communication connection, wherein this coupling is established, for example, by means of the coupling interface 18 and the counter-coupling interface 19. The monitoring module arrangement 2 furthermore comprises a plurality of spacing modules 21. The spacing modules 21 in each case have a spacing module geometry. The spacing modules 21 are configured to provide the spacing module geometry by means of a data communication coupling between the spacing module 21 and the monitoring module 4, the monitoring module arrangement 2 and/or the evaluation device 3.

The monitoring data and the spacing module geometry are supplied to the evaluation device 3. Based on the knowledge of at least one known position of a monitoring module 4 together with the monitoring data and the spacing module geometry, the evaluation device 3 is configured to determine the positions of the other monitoring modules 4 and/or cameras 6 of the monitoring module arrangement 2. An object 9 can be tracked and/or detected along the course of the monitoring module arrangement 2 through the arrangement of the monitoring modules 4 in the monitoring area 5.

Figure 5:
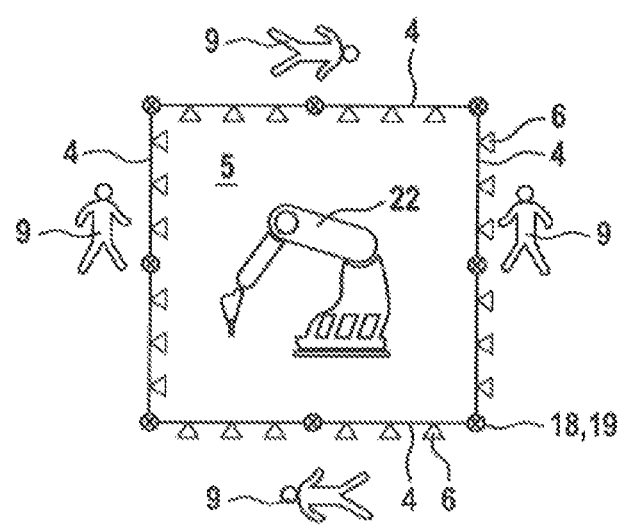
FIG. 5 shows one example of a method for monitoring an installation.

FIG. 5 shows a facility for monitoring an installation 22 with the monitoring module arrangement. The installation 22 is, for example, a robot which is movable in a working area. To operate the installation 22, it is necessary that no person, generally no object 9, enters this working area. For this purpose, the installation 22 and, in particular, the working area 9, are surrounded by the monitoring module 4. The monitoring area 5 is thus formed by the working area of the installation 22. Since the cameras 6 of the monitoring modules 4 have an overlap of the fields of view 8, the working area can be monitored, in particular, three-dimensionally. It is thus possible to detect as soon as an object 9 approaches the working area too closely, wherein the evaluation device 3 is configured, for example, to deactivate the installation 22 if an object 9 is too close to the installation 22.

Figure 6:
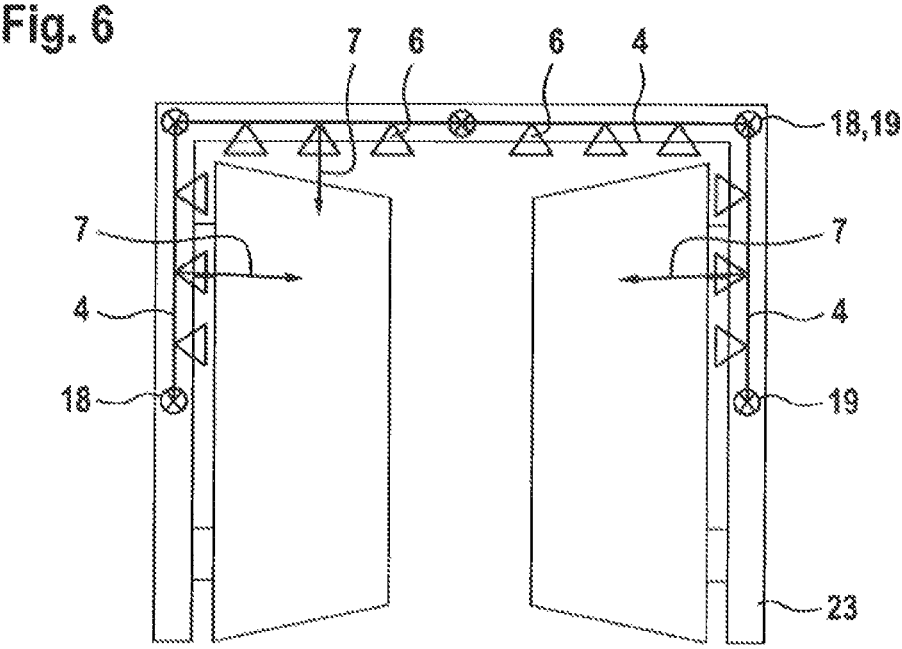
FIG. 6 shows one example of a method for monitoring an access.

FIG. 6 shows a possible arrangement of the monitoring modules 4 for monitoring a passageway. The passageway is formed by a door 23. The monitoring modules 4 are arranged on the door frame. The monitoring modules 4 are aligned on the lateral door frames with a direction of view 7 toward the face of the person passing through. Biometric data, for example, of the person passing through can be collected by means of these cameras 6. The cameras 6 of the monitoring module 4 on the upper door frame of the door 23 are aligned with a downward direction of view 7, wherein the evaluation device 3 can determine whether the person has actually passed through the door on the basis of these image data.

Figure 7:
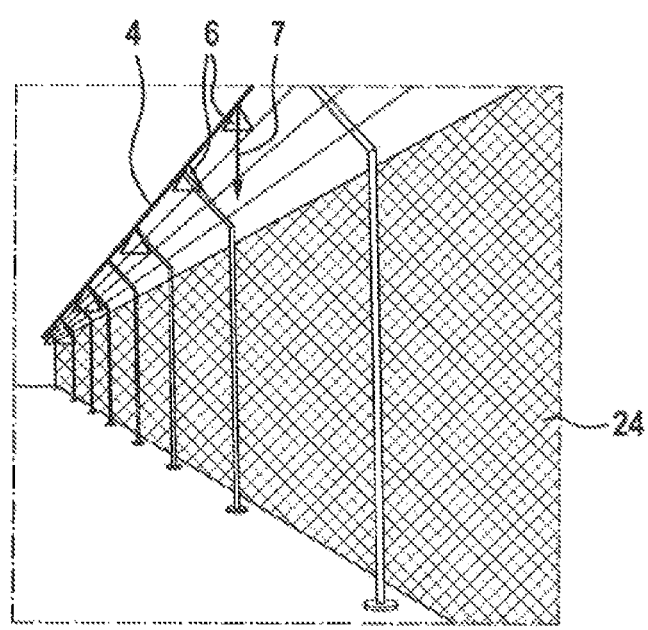
FIG. 7 shows one example of a method for monitoring a barrier fence.

FIG. 7 shows an arrangement of the monitoring modules 4 for monitoring a monitoring fence 24. The monitoring modules 4 are arranged in the upper area of the monitoring fence 24, wherein the direction of view 7 of the cameras 4 is aligned diagonally downward. By means of the monitoring data provided by the monitoring modules 4, the evaluation device 3 can detect a person in the area to be secured and, if necessary, inform a guard. It is provided, for example, that the cameras 6 are configured as infrared cameras so that the monitoring modules 4 can also be operated at night.

The invention claimed is:

1. A monitoring module arrangement, comprising
a plurality of monitoring modules, wherein the monitoring modules are coupled mechanically or via a data connection, wherein each of the monitoring modules is for visual monitoring of a monitoring area, wherein each of the monitoring modules including at least three cameras to monitor the monitoring area, wherein each of the monitoring modules is strip-shaped or bar-shaped, wherein the cameras are arranged at defined camera intervals along a longitudinal extension of the monitoring module; and
a spacing module that has a spacing module geometry and is configured for the spacing of two monitoring modules and can be coupled mechanically or via a data communication connection to the monitoring modules, wherein the spacing module is configured to provide spacing module data, wherein the spacing module data comprise the spacing module geometry.

2. The monitoring module arrangement according to claim 1, wherein each of the monitoring modules is configured to mechanically couple to a further monitoring module of the same type.

3. The monitoring module arrangement according to claim 1, wherein each of the monitoring modules is flexible.

4. The monitoring module arrangement according to claim 1, wherein each of the monitoring modules further comprising:
a camera attachment section and a communication section, wherein the cameras constitute the camera attachment section, wherein the communication section is coupled mechanically or via a data communication connection to the camera attachment section, wherein the camera attachment section is connectable by means of the communication section to a ceiling or a wall.

5. The monitoring module arrangement according to claim 4, wherein the communication section and the camera attachment section are strip-shaped or bar-shaped.

6. The monitoring module arrangement according to claim 4, wherein the communication section comprises a communication interface to provide monitoring data, wherein camera data of the cameras of the camera attachment section are supplied to the communication section and the monitoring data comprise the camera data.

7. The monitoring module arrangement according to claim 1, wherein each of the monitoring modules is configured to supply at least one selected from the group consisting of a module ID, a module geometry, a module position, the camera spacings and the camera positions to an evaluation device or a coupled monitoring module.

8. The monitoring module arrangement according to claim 1, further comprising a sensor for monitoring the monitoring area and for the provision of sensor data, wherein the monitoring data comprise the sensor data.

9. The monitoring module arrangement according to claim 1, wherein one of the monitoring modules forms a collective transmit module, wherein the monitoring data of all monitoring modules of the monitoring module arrangement are supplied to the collective transmit module, wherein the collective transmit module is configured to forward the monitoring data of all monitoring modules to the evaluation device.

10. The monitoring module arrangement according to claim 1, wherein the monitoring data comprise coupling data, wherein the coupling data comprise information from the monitoring modules which are coupled to one another.

11. A monitoring installation comprising:
an evaluation device; and
the monitoring module arrangement according to claim 1, wherein monitoring data of the monitoring modules are supplied to the evaluation device, wherein the evaluation device is configured to visually monitor the monitoring area on the basis of the monitoring data, to generate a 2D or 3D view of the monitoring area or to track an object movable in the monitoring area.

12. The monitoring installation according to claim 11, wherein the evaluation device is configured to determine the camera positions in the monitoring area on the basis of a model of the monitoring area, and at least one selected from the group consisting of the module ID, the module geometry, the module position, the coupling data, the camera spacings, and the spacing module geometry.

* * * * *